United States Patent
Ben-Yair et al.

(10) Patent No.: US 8,577,018 B1
(45) Date of Patent: Nov. 5, 2013

(54) SYSTEMS AND METHODS FOR PROVIDING AGENT QUEUES

(75) Inventors: Gal Ben-Yair, Sunnyvale, CA (US); Venkatakrishnan Raman, Santa Clara, CA (US)

(73) Assignee: Shoretel, Inc., Sunnyvale, CA (US)

( * ) Notice: Subject to any disclaimer, the term of this patent is extended or adjusted under 35 U.S.C. 154(b) by 229 days.

(21) Appl. No.: 13/051,057

(22) Filed: Mar. 18, 2011

(51) Int. Cl.
*H04M 3/00* (2006.01)

(52) U.S. Cl.
USPC ............ 379/266.01; 379/142.04; 379/266.03; 379/266.04

(58) Field of Classification Search
USPC ............ 379/142.01, 266.01, 266.03, 266.04, 379/309, 201.01, 142.04; 370/412, 413, 370/429
See application file for complete search history.

(56) References Cited

U.S. PATENT DOCUMENTS

| | | | |
|---|---|---|---|
| 5,903,641 A * | 5/1999 | Tonisson | 379/265.12 |
| 6,163,607 A * | 12/2000 | Bogart et al. | 379/266.01 |
| 6,320,956 B1 * | 11/2001 | Cherry | 379/265.02 |
| 6,493,695 B1 | 12/2002 | Pickering et al. | |
| 6,650,748 B1 | 11/2003 | Edwards et al. | |
| 2007/0121894 A1 * | 5/2007 | Noble | 379/265.02 |
| 2009/0003584 A1 | 1/2009 | Walker et al. | |
| 2010/0195814 A1 | 8/2010 | Gao | |

FOREIGN PATENT DOCUMENTS

WO    WO 2010/012173 A1    2/2010

* cited by examiner

*Primary Examiner* — Duc Nguyen
*Assistant Examiner* — Yosef K Laekemariam
(74) *Attorney, Agent, or Firm* — Tarolli, Sundheim, Covell & Tummino LLP (57) ABSTRACT

This disclosure relates to using agent queues for a contact center. An agent queue profile includes parameters to configure an agent queue for each agent that is assigned to the agent queue profile. An agent queue profile manager is programmed to assign a given agent to the agent queue profile to define a corresponding agent queue for the given agent. The agent queue profile manager can also define parameters for the agent queue profile. A distribution module can control distribution of a transaction in the corresponding agent queue based on rules and can control handling of the transaction in the corresponding agent queue based on the agent queue profile.

21 Claims, 4 Drawing Sheets

FIG. 1

| QUEUE DATA 124 | | | | |
|---|---|---|---|---|
| 120 | 122 | 118 | 126 | 128 |
| TRANSACTION DATA | STATUS | ACD GROUP | QUEUE ID | PRIORITY |
| IRN, 20003, 20002, 20324 | CONNECTED | PREMIUM GROUP | GROUP_1 | 5 |
| IRN, 20005, 20006, 20258 | CONNECTED | AGENT QUEUE | AQ_17 | 25 |
| IRN, 20014, 200014, 20207 | RINGING | AGENT QUEUE | AQ_11 | 26 |
| IM, IM_STD, IM_261 | RESPONSE DUE | AGENT QUEUE | AQ_17 | 50 |
| CALLER ID, TEMP | CALLBACK | AGENT QUEUE | AQ_9 | 50 |
| ⋮ | | | | |
| IRN, 20014, 200014, 20207 | RINGING | STD_GROUP | GROUP_17 | 60 |

SYSTEMS AND METHODS FOR PROVIDING AGENT QUEUES

TECHNICAL FIELD

The present disclosure relates to implementing agent queues, such as for a contact center system.

BACKGROUND

Call centers and contact centers are utilized by many companies for the purpose of receiving and transmitting a large volume of requests by telephone or other forms of communication, such as email, online chat, website information exchange, fax, and instant messaging. In addition to servicing incoming requests to the company, the call center or contact center can also be utilized for outgoing communication, such as for telemarketing, contacting clientele, and debt collection.

Call centers and contact centers can implement automatic call distribution to route calls to an appropriate agent when available. If an agent is not available, the automatic call distribution can place incoming and outgoing calls into queue until an appropriate agent is available to receive the call. The queue may be a universal queue that can be accessed by any agent or calls can be placed in a queue that is assigned to a specified group.

SUMMARY

The present disclosure relates to systems and methods for implementing agent queues.

As one example, a system can include a processor and memory. The memory can store an agent queue profile that includes parameters to configure an agent queue for each agent that is assigned to the agent queue profile. The processor can access the memory and execute instructions, including an agent queue profile manager programmed to assign a given agent to the agent queue profile to define a corresponding agent queue for the given agent. A distribution module can control distribution of a transaction into the corresponding agent queue based on rules and can control handling of each transaction in the corresponding agent queue based on the agent queue profile.

As another example, a non-transitory computer-readable medium having computer-executable instructions can include an agent queue manager programmed to set parameters of an agent queue profile and to assign a given agent to the agent queue profile to define a corresponding agent queue that is personal for each given agent that is assigned to the agent queue profile. A distribution module can be programmed to control routing of a transaction within a contact center, including routing of the transaction to the corresponding agent queue, based on rules. An agent queue function can be programmed to control handling of each transaction that is pending in the corresponding agent queue based on the parameters of the agent queue profile.

As yet another example, a contact center system may include a distribution module to control routing of each transaction that enters the contact center system based on rules stored in memory. An agent queue profile includes parameters to control handling of each transaction that is placed in a corresponding agent queue, the parameters of the agent queue profile being stored in the memory. An agent queue manager can be programmed to assign each selected agent to the agent queue profile to generate the corresponding agent queue personal to the selected agent. An agent queue function can be programmed to control handling of each transaction that is placed in the corresponding agent queue based on the parameters of the agent queue profile.

DETAILED DESCRIPTION

This disclosure relates to systems and methods for implementing agent queues, such as can be implemented in a contact center. The functionality of a given agent queue can be defined by an agent queue profile (AQP). Each respective agent in a contact center may be assigned to an AQP to provide a corresponding agent queue that is personal to each respective agent. There may be any number of AQPs and any number of one or more agents can be assigned to each AQP. Each AQP is a programmable construct that defines parameters for handling transactions relative to each agent queue associated with the AQP. Once an agent has been assigned to a given AQP, the call distribution module can employ automatic call distribution methods to control placement of transactions in a corresponding agent queue for the given agent based on the parameters of the associated AQP. As described herein, each agent queue can operate as an intelligent routing number, a script, a service and/or a group within the contact center system.

As used herein, a transaction refers to a contact center transaction (e.g., a communication session), such as can include a telephone call, an email thread, an instant messaging session, an online chat session as well as other forms of multi-media communication that exist or have yet to be developed.

As used herein, an intelligent routing number (IRN) corresponds to an entry point to the routing system or contact center. A given contact center can include a distribution module programmed for routing an inbound transaction to various destinations including an IRN. Such destinations can include services, call control scripts, agent queues and devices. For example, an inbound call to the distribution module can be reached by dialing an extension number, corresponding to an IRN, which is linked to a route point. An inbound transaction to a given IRN can also be routed to a transaction control script that provides a set of actions that are performed on a respective transaction according to logical and/or physical events or conditions.

As used herein, a service can be utilized to define how a transaction is processed in the contact center system. For example, each incoming call or other type of transaction to a given route point in a contact center can be assigned to a particular service, which can vary depending upon the purpose and/or configuration of the contact center. Examples of services can include sales of specific products, banking services, travel agency services and the like.

As used herein, a group can correspond to a specialized unit of agents that can receive and initiate transactions within the contact center. For example, a group can be a destination for calls routed to a given IRN, and calls that are provided to a group can be presented to a most appropriate agent in the group according to the routing policy and rules that have been defined for such group.

Figure 1:
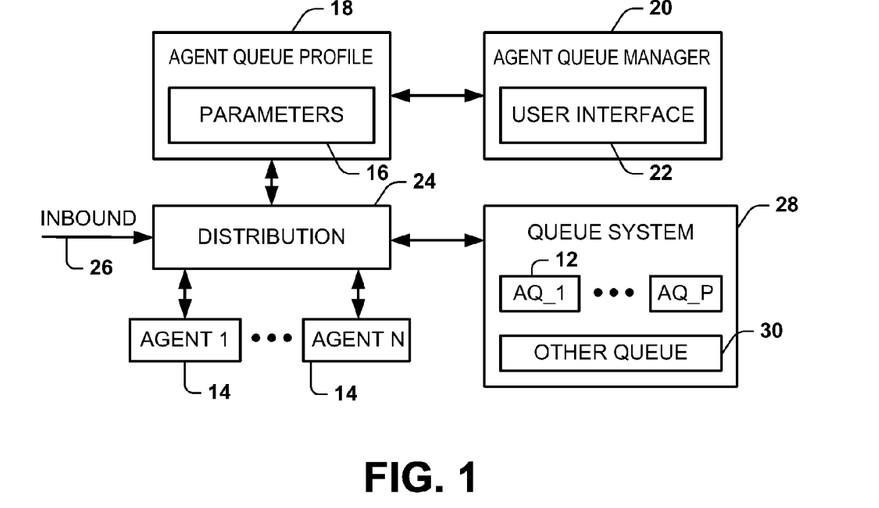
FIG. 1 depicts an example of a system for implementing an agent queue.

Turning to the figures, FIG. 1 depicts an example of a system 10 implementing agent queues 12. In the example of FIG. 1, the agent queues 12 are demonstrated as agent queues AQ_1 through AQ_P, where P is a positive integer denoting the number of agent queues. Each agent queue 12 can be assigned to a corresponding agent 14, demonstrated as AGENT 1 through AGENT N where N is a positive integer denoting the number of agents in the system 10. Since each agent 14 may be (but is not required to be) assigned an agent queue 12, N can be greater than or equal to P.

Each of the agent queues 12 exhibits behavior in the system 10 based upon a set of parameters 16 that are part of an agent queue profile 18. While in the example of FIG. 1, a single agent queue profile 18 is demonstrated, there can be any number of agent queue profiles implemented in the system. Each agent queue profile 18 can be utilized to generate a corresponding agent queue for an agent 14.

The system 10 also includes an agent queue profile manager 20 that is operative to generate and manipulate (e.g., edit or delete) each agent queue profile. The agent queue profile manager 20, for example, can be implemented as computer executable instructions that include a user interface 22. The user interface 22 can provide access to functions and methods for configuring the parameters 16 of the agent queue profile 18. The user interface 22 of the agent queue profile manager 20 can also access functions and methods to assign each agent queue profile 18 to any number of one or more agents. The corresponding parameters 16 of the agent queue profile 18 can be programmed to control how each transaction is handled for each instance of the agent queue 12. For example, the parameters 16 can configure interflow, overflow, establish priority, and set thresholds for determining re-routing of calls for a given agent queue 12. The parameters 16 can also establish an alternative routing destination for a given agent queue 12 when a corresponding agent is not logged in to the agent queue. The parameters 16 can also define a callback destination for an agent queue in the event that a transaction is abandoned by the party who initiated such transaction.

As a further example, the system 10 includes a distribution module 24 that can receive an inbound transaction at a corresponding input indicated at 26. For instance, the distribution module can correspond to automatic call distribution (ACD) methods. The distribution module 24 thus can employ routing rules and policies, including those defined by the parameters 16 of the agent queue profile 18, for routing transactions for the system 10. For instance, the distribution module 24 can receive an inbound transaction and route such transaction to a route point, such as can correspond to an IRN. The IRN can be associated with a given agent and the personal agent queue 12 for such agent. Alternatively or additionally, the IRN can be associated with a service such that the call is routed from the IRN to the corresponding service that has been associated with such IRN. As another example, an IRN can be associated with a group, in which case the distribution module 24 can route the transaction to an available agent that belongs to such group based upon the routing rules that have been established. If the distribution module 24 determines that no appropriate agent for such group is available for routing the incoming transaction, the distribution module can send the transaction to a corresponding group queue of a queue system 28.

By way of further example, if the distribution module 24 determines that an inbound transaction should be routed to a given agent 14, the distribution module 24 can route the inbound transaction directly to such agent based on routing rules and policies. If the respective agent to whom the inbound transaction is being routed is determined to be unavailable and the agent has been assigned an agent queue 12, however, the distribution module 24 can place the inbound transaction in the agent queue 12 that has been assigned to such agent. Once a transaction is placed in a corresponding agent queue 12, the transaction is handled (e.g., routed from the queue) according to the parameters 16 of the agent queue profile 18 for such agent queue. The corresponding agent 14 can employ tools at a device (e.g., a computer, work station or telephone apparatus) to answer a call from the agent's agent queue 12. The agent 14 can also employ the tools to view and otherwise manage pending transactions that have been placed in the agent's queues, including the agent's personal agent queue 12.

In the example of FIG. 1, the agent queues 12 are demonstrated as being part of the queue system 28. The queue system 28 can include one or more data structures (e.g., tables, linked lists or arrays) that are configured for holding pending transactions that are awaiting an available agent. The queue system 28 thus can include one or more other queues 30 in addition to the agent queues 12. For example, the other queues 30 can correspond to respective group queues. Each group queue corresponding to a defined group of selected agents each of which can access and receive calls from such group queue. As an example, a given agent can employ a queue monitor tool that provides a user interface to view and manipulate calls that may be placed in a set of queues to which the given agent has access. Access to each such queue can be allowed, for example, while the agent user is logged-in to such queue.

As an example, the queue system 28 can include fields specifying various attributes of each transaction, such as describing the type of queue and the name or identifier for such queue and other pertinent details about each respective transaction. The distribution module 24 can employ the transaction information to access rules and routing policies to control handling transactions in a given queue, such as routing the transaction to an appropriate agent or taking other actions for the queued transaction. The distribution module 24 may connect a given agent 14 with the corresponding queued transaction when the agent becomes available or in response to a user input provided by the agent for retrieving or answering the transaction. A given agent may be able to handle more than one transaction concurrently, including more than one transaction of the same type or different types of transactions.

Figure 2:
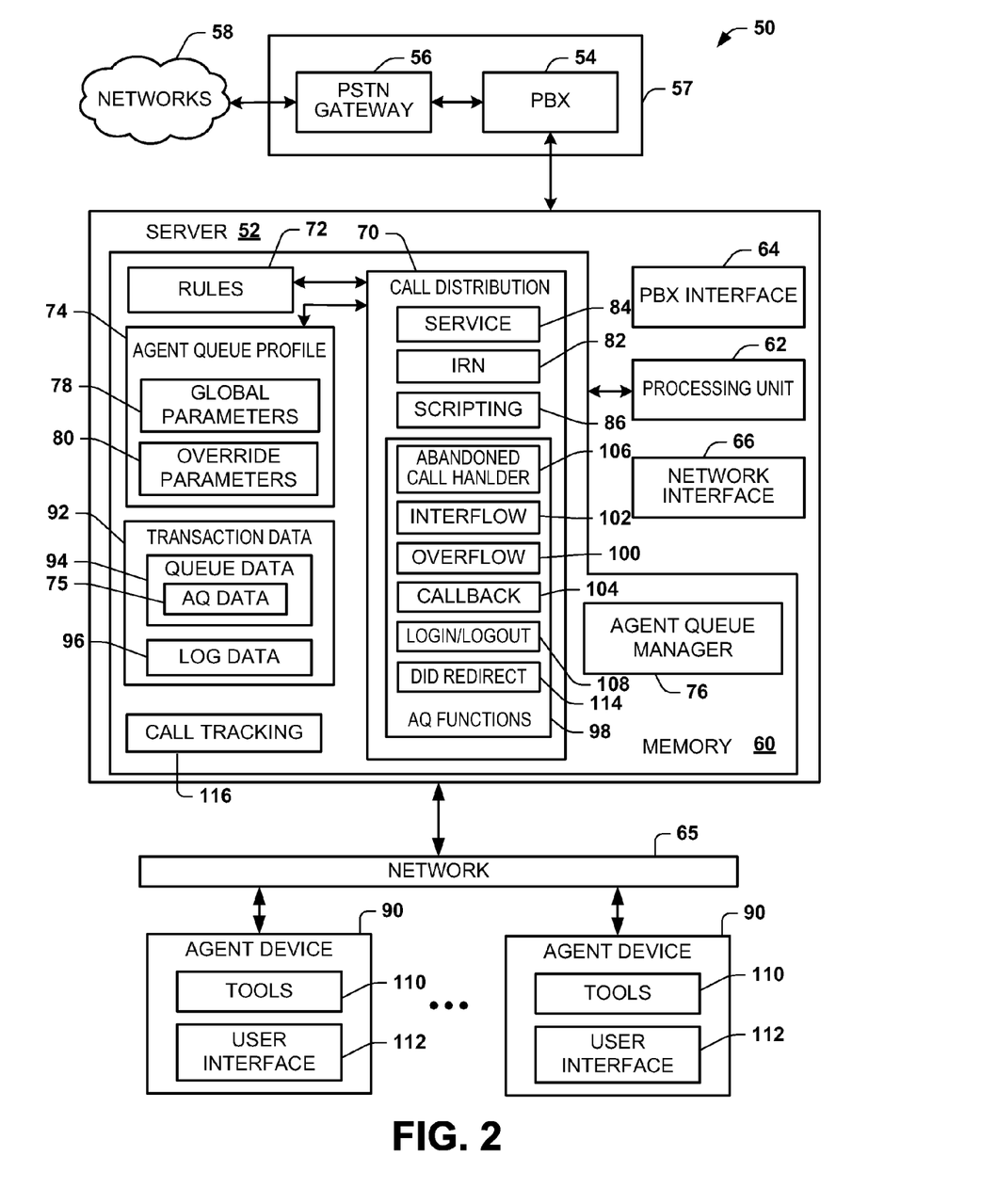
FIG. 2 depicts an example of a contact center implementing agent queues according to an embodiment.

FIG. 2 depicts an example of a contact center system 50 that is configured to implement agent queues. In the example of FIG. 2, the system 50 includes a server 52 that is coupled to private branch exchange (PBX) 54. The PBX 54 can include a switching network and a processor or other logic to control connecting an inbound transaction with an internal routing point or initiating an outbound call from the system 50. As one example, the PBX can be an internet protocol (IP) PBX configured for communication using an internet protocol. The PBX 54 can be integrated with a public switch telephone network (PSTN) gateway 56 as demonstrated by the PBX-gateway 57. The PBX-gateway 57 can communicate over a network 58 for sending outbound transactions or receiving inbound transactions relative to the server 52. As mentioned above, a transaction can be implemented in a variety of different forms of multimedia communication, such as can include telephone call sessions, email sessions, IM sessions, online chatting sessions or the like. A given transaction may also involve more than one type of media communication. The PBX 54 can be configured to accommodate any type of transactions.

The server 52 includes a memory 60 and a processing unit 62. The memory stores computer readable data and instructions. The processing unit 62 accesses the memory 60 and executes the instructions associated therewith for performing the functions of the contact center system 50, as described herein. The server 52 can also include a PBX interface 64 that provides for communication between the PBX 54 and the server 52. For the example, where the PBX 54 is implemented as an IP-PBX, the PBX interface can correspond to an IP interface.

While in the example of FIG. 2, the PBX 54 is demonstrated as being separate from the server 52, in other embodiments the functionality thereof could be implemented as part of the server. Additionally, while the server 52 is demonstrated as a unitary system, the functions, methods and data demonstrated in the example of FIG. 2 can be distributed across any number of one or more servers or other types of computers. The server 52 can also be connected to another network 65 via a network interface 66. The network 65 can be implemented as a local area network (LAN), a wide area network (WAN) and further may be implemented as including a wireless and/or non-wireless (e.g., fiber optic or electrically conductive) communication technologies. The network 65 may form part of the network 58, such that transactions can be sent or received from the system via the network 65.

In the example of FIG. 2, the memory 60 includes a call distribution module 70 that is programmed to distribute telephone calls as well as other types of multimedia transactions for the contact center system 50. The call distribution module 70 thus can be programmed with functions, methods and parameters for routing transactions within the system 50. For example, the call distribution module 70 can employ rules 72 as well as parameters in an agent queue profile 74 to control distribution of transactions in the contact center system 50. For instance, the call distribution module 70 is configured to identify a route point within the system 50 for each transaction and employ a subset of the rules 72 associated with such route point to control handling and routing of such transaction to the appropriate destination. As described herein, the destination can include a service, a control script, a device or an agent queue. Transactions routed to an agent queue can be stored as agent queue data 75. Each agent queue can operate as an IRN, a service or as a control script for transactions routed in the system 50.

Agent queue functions 98 control how calls within a given agent queue are handled based on parameters defined for an associated agent queue profile 74, which can be stored in memory 60. The system 50 includes an agent queue manager 76 that is programmed to generate and manipulate each agent queue profile. For example, the agent queue manager 76 includes a user interface (e.g., a GUI) that is configured to create a new agent queue, as well as set parameters thereof. In the example of FIG. 2, the parameters are demonstrated as including global parameters 78 and override parameters 80. The global parameters 78 of a given agent queue profile 74 can correspond to a set of profile parameters that are utilized for each agent queue that is associated with the given agent queue profile. Each agent queue derives its operational behavior from an associated agent queue profile that is established in response to the agent queue manager 76 assigning a given agent to the agent queue profile. The assignment of agents to the agent queue profile 74 can be stored as part of the global parameters for the agent queue profile. The agent queue manager 76 can also be programmed to establish one or more of the override parameters 80, which can be customized for a given agent queue. In this way the call distribution module 70 can control routing and distribution of calls from a given agent queue based upon the associated global parameters and, if any, the override parameters 80.

As an example, if an authorized user (e.g., a supervisor or administrator) modifies global parameters 78 of a given agent queue profile 74, the changes will be propagated and utilized for controlling distribution and routing of calls for each instance of agent queue that is assigned to such profile. The override parameters 80, however, can be associated with a given agent such that changes or additions to the override parameters 80 remain specific to the particular agent and corresponding agent queue for which they apply.

By way of example, an incoming transaction can be routed to the server 52 via the PBX 54. The PBX interface 64 can provide pertinent transaction information (e.g., intended route point and caller/transaction information) to the call distribution module 70. The call distribution module 70 is programmed to apply the rules 72 to the transaction information and apply appropriate routing methods to distribute the transaction accordingly. For instance, the call distribution module 70 can employ a variety of methods for each route point in the contact center 50 to control routing of each transaction. These methods can include an IRN routing method 82, a service routing method 84 and a scripting routing method 86. Each of the routing methods 82, 84 and 86 can be configured to employ rules 72 for routing a transaction within the system 50.

For example, an IRN can be utilized to route calls to a specified agent that can be logged into the system 50 via an agent device 90. Any number of agent devices 90 can be connected to the system 50—either directly or via the network 65. The agent devices 90 can be implemented as including a computer, a telephone, a work station or other device via which an agent user can communicate via one or more forms of multimedia for transactions in the system 50. If an appropriate agent is available for an incoming transaction, based on application of one or more of the routing methods 82, 84 and 86, the call distribution module 70 can route the transaction to the corresponding agent device 90 into which the agent user has been logged-in. If an appropriate agent is not available, however, the call distribution module 70 can employ corresponding methods 82, 84 and/or 86 for handling the transaction in the system 50.

Information associated with a given transaction that enters the system 50 can be stored as transaction data 92 in the memory 60. Such transaction data 92 can include queue data 94 as well as log data 96. The queue data 94 can include information associated with each transaction that has been routed to a queue, such as an agent queue (corresponding to the agent queue data 75), a group queue or other type of queue that may be implemented within the system 50. The log data 96 includes transaction information associated with each transaction, including pending transactions, on-going sessions and/or historical information (e.g., call duration, agent ID, caller information, and the like). The log data 96 thus can be utilized for generating reports, which may be used to evaluate performance for the contact center system 50.

As a further example, the call distribution module 70 can be programmed to route a transaction to an agent queue that is personal to a given agent. The transaction can correspond to an inbound transaction, an outbound transaction, or to a transaction that is being transferred within the system 50 from another queue or agent. For example, the call distribution module 70 can employ the IRN routing method 82 to route an inbound call to a route point that is associated with a given agent based upon associated rules 72. If the given agent is unavailable, the rules can specify an alternative agent or group to which the call should be routed or it can specify that the call be routed to the given agent's agent queue.

Similarly, the call distribution module 70 can also employ the service routing method 84 to distribute a transaction to a personal agent queue for a specified agent based upon associated service rules 72. For example, the service routing method 84 can employ such rules 72 to route the transaction according to selected routing methods (e.g., best fit, agent's skills or other criteria) defined by the service rules. Thus, if a given agent destination has an agent queue and is not available, the service routing method 84 can place a transaction into a given agent's agent queue.

The scripting routing methods 86 can be utilized to implement a set of actions on a transaction, such as to provide information (e.g., in the form of one or more announcements) and/or collect information (e.g., in response to input from the remote party of a transaction). The scripting routing methods 86 can also perform routing of transactions within the system according to logical and physical events associated with each transaction that is being processed by the scripting routing method.

By way of example, a supervisor or administrator can configure the system 50 to handle transactions using one or more of the routing methods 82, 84 and 86. For example, an authorized user can employ a corresponding user interface to select a route destination as part of a transaction control script, and such destination can include identifying different types of destinations including, for example, a service, a group or an agent queue, which destination type may vary depending on the transaction information and what information is collected by the script. If services are selected as a type of destination, a set of available services can be provided to the user as a list from which a corresponding service can be selected for configuring the scripting method. If "agent queue" is selected as a destination type, values can be populated to provide a list of available agents who have agent queues that have been assigned and are enabled.

The call distribution module 70 can also be configured to route a transaction to an agent queue from other service features. For example, an authorized user, such as an administrator or supervisor, can select an agent queue as an overflow destination, an interflow destination, as a no-agents destination, as a callback destination and/or as an abandoned call destination. Thus, a transaction can be placed into an agent queue via a variety of mechanisms implemented within the contact center system.

Once a transaction is placed in an agent queue, agent queue functions 98 can control further handling of the call within the agent queue. That is, agent queue functions 98 can employ the parameters 78 and 80 in the agent queue profile 74 to transfer a transaction from a given agent queue to another destination, such as another agent, an agent queue, a group, a service or a script.

As a further example, agent queue functions 98 can include an overflow method 100 that can expand the available set of agents that can service a respective transaction from a given agent queue in response to determining the occurrence of an overflow condition. The overflow method 100 can employ the parameters 78, 80 set in the agent queue profile 74 to determine whether an overflow condition to exist. If an overflow condition exists, the overflow method 100 can send a transaction from the given agent queue to another agent queue or to a specified group based on overflow parameters 78, 80 specified in the agent queue profile 74.

The overflow method 100 can also be programmed to employ agent selection criteria (stored in memory 60 as the parameters 78, 80) to select an appropriate agent, group or other destination to which the transaction will be sent if an overflow condition exists. Examples of agent selection criteria include a longest idle agent (e.g., assigning the transaction to an agent who has been idled the longest), circular (e.g., searching queues agent's list so that the next call will go to the next available agent in an attempt to distribute calls evenly), and the best skill fit (e.g., searching for an agent whose skills best fit the requirements of the calls). A combination of call selection criteria features can also be utilized.

Additionally, agent queue profile parameters 78, 80 can be set to identify an overflow destination, such as can include a group or another agent queue. For the identified destination, the parameters 78, 80 can also identify a time out interval, which can set a duration that a transaction remains in queue after a mandatory announcement is made and the call is transferred to the identified overflow destination.

The agent queue functions 98 can also include an interflow routing function 102 for controlling routing from an agent queue in response to determining the occurrence of an interflow condition. The interflow function 102 can determine the interflow condition for a given agent queue based on corresponding parameters 78, 80 of the agent queue profile 74, such as after a specified period of time has been reached, corresponding to an interflow condition. Once a transaction is interflowed it is no longer part of the ACD domain, meaning that the interflowed transaction re-enters the system as a new transaction. The interflow parameters in the agent queue profile 74 can include an interflow type of destination and a selected destination to which the transaction can be interflowed from an agent queue. The selected destination may include an IRN, a service, a device, a script or another agent queue. The timing interval utilized to reach an interflow condition can also be set by the user as part of the global parameters 78 of the agent queue profile 74.

The call distribution module 70 can also include a callback function 104 that can be operative to route an incoming transaction to a control script programmed to collect callback parameters. For example, the global parameter 78 of the agent queue profile 74 can include parameters for initiating the call control script, such as including an announcement that enables a caller to request a callback rather than having the caller continue to wait in a given agent queue. The call control script can request that the caller identify parameters such as the callback telephone number and the desired time frame for the callback. The callback transaction (e.g., an outbound transaction) can be placed into the agent queue based upon the parameters entered by the caller.

In other situations, a caller may abandon the call after being in the agent queue before the call can be handled by the associated agent. The agent queue functions 98 can include an abandoned call handler 106 to automatically generate a callback transaction that can be placed into a given agent agent's queue to initiate the callback. In order to control the callback for the abandoned call handler, parameters 78 of the agent queue profile 74 can be set (e.g., by the agent queue manager 76) to establish the abandoned call parameters. The agent queue manager 76 thus can set abandoned call parameters including enabling or disabling the abandoned call handler function 106, a time threshold that a transaction must be in the IRN before being considered abandoned, a script that may be played before transferring a callback to the respective agent. A parameter may also be set to allow a given agent to accept or not accept the callback transaction, such as in response to activating a user interface element via the agent device 90.

The agent queue functions 98 can also include a login/logout function 108 that is utilized to control logging into and out of an agent queue by a given agent. The login/log out method 108 may operate in conjunction with other login/logout controls implemented within the system 50. The login/logout function 108 can utilize corresponding global parameters 78 and/or override parameters 80 of the agent queue profile 74 to control automatic login to the agent's agent queue when logging into another group to which the agent has been assigned. In this way, a single login can be achieved for a given agent to facilitate logging on to each queue and group to which the agent has been assigned, including the agent's personal agent queue. The login/logout function 108 can also be utilized to provide for selective login or logout of a given agent queue. For instance, an agent user can log into or log out of each queue separately, provided that separate login/logout has been enabled by the administrator (e.g., via the agent queue manager 76).

The global parameters 78 and/or override parameters 80 of the agent queue profile 74 can be programmed via the agent queue manager 76 to control rerouting of pending transactions from a corresponding agent queue to another destination in response to a given agent logging out of the agent's agent queue. For instance, if an agent initiates a logout of the agent queue while one or more transactions are pending in the respective agent queue, the tools 110 and user interface 112 can prompt the user to confirm whether the user wishes to log out of the agent's agent queue. If the user still confirms the log out, the log out may proceed. However, if the user specifies that he does not wish to log out, the agent can remain logged into his agent's queue. If the agent completes the logout of the agent's agent queue while one or more transactions are in the agent queue, such transactions can be routed by the call distribution module 70 via the login/log out function 108 to a "no-agent destination" destination specified in the agent queue profile. The "no-agent destination" destination may be a service, a group, a script or another agent queue. Such destinations can be set by an authorized user (e.g., via the agent queue manager 76) or, if enabled, by the agent such as via agent tools 110.

Each agent device 90 can employ a set of such agent tools 110. The agent tools 110 can include functions and methods for handling and/or monitoring transactions that are associated with a given agent. The agent device 90 can employ a user interface 112 for accessing the corresponding functions and methods provided by the agent tools 110. The user interface 112 can vary depending upon the type of agent device 90. For an example where the agent device 90 comprises a computer and a display, the user interface 112 can include GUI that can access tools for answering a call, viewing one or more queues that are associated with the agent, manipulating queues and are placing calls into a given queue.

As another example, the override parameters 80 of an agent queue profile 74 can be programmed to redirect a given agent's direct inward dial (DID) calls to the contact center system 50. The override parameters 80 of the profile can be set to control a DID redirect method 114 for internally originating DID calls, externally originating DID calls or both internal and external DID calls for each given agent that has been assigned an agent queue. The redirect method 114 can also be programmed, based on the redirect override parameters 80, to redirect other call variations on dialing or mechanisms that can be employed to reach the agent directly, such as by the agent's extension number being dialed, or a call be transferred to the agent's extension by another user or from an automated attendant. For example, the DID redirect method 114 can provide instructions for programming the PBX 54 to redirect calls to the agent's extension to a specified route point in the system 50 based on the redirect override parameters 80.

As an example, when the PBX 54 has determined that a redirect is required for a DID call, the PBX can update the call properties and redirect the call to the specified route point. Such redirected call will be routed by the redirect routing method 114 of the call distribution module (based on the redirect parameters) to the correct agent's agent queue based on the DID and the updated call properties. By implementing the redirect for a DID call to an agent's agent queue, DID calls can be processed and tracked within the contact center system 50. For example, a call tracking function 116 can store observational data associated with such redirected calls so that information relating to these calls can be tracked and monitored. Such information can include an indication of how many such calls were received, internally or externally, and the duration of each call. This observational data can be stored as part of the log data 96. The information can be statistical information for each agent or it can be stored as call details for each DID call. In this way, each agent's time and resources within the contact center can be prioritized and tracked for DID calls. Since the agent is really suppose to be focusing on call center issues, this tracking mechanism allows a supervisor or other authorized user to see when time is being wasted on non-contact center issues.

Additionally, the call that is redirected to the given agents agent's queue can also be identified to the agent via the agent user interface 112 as a DID call. For example, the user interface can display calls in the agent's queue with transaction information, including an identification of the caller ID for the calling party and the type of call, such that a given agent can make an informed decision whether or not to elect to answer or not answer the DID call.

Additionally, the agent tools 110 and associated user interface 112 can also provide a given agent the ability to control and monitor transactions on the agent's queues. Calls that are placed in a given agent's agent queue can be distinguished from calls in a group queue by identifying such calls via the user interface 112 as residing in an agent queue or a specified group queue. Thus, this affords an additional layer of specificity to assist an agent in handling calls. Additionally, agent supervisor tools are improved so that agents can be monitored more effectively since calls and other transactions to the agent queues are distinguished from those on a group queue.

Figure 3:
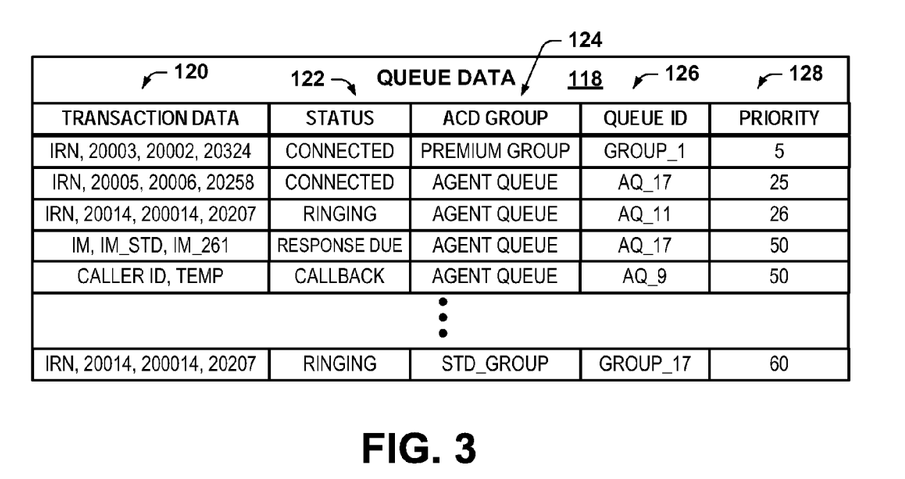
FIG. 3 depicts an example of queue data that can be implemented in a queue system.

FIG. 3 depicts an example of queue data structure 118 demonstrated in the example of FIG. 2. In the example of FIG. 3, the queue data structure 118 provides a queue of transactions that are pending within the contact system. Each transaction in the queue data structure 118 can include a plurality of fields that describe different attributes of the transaction. For example, the fields can include transaction data 120, status data 122, ACD group data 124, queue ID data 126 and priority data 128. Different fields can also be specified for a given queued transaction.

The transaction data 120 can include fields for a variety of different properties or attributes for each transaction. For instance, the transaction data 120 can include attributes that identify the type of transaction, such as including to an IRN transaction, an instant messaging (IM) transaction, an email transaction, an online messaging transaction or the like. The transaction data 120 can also include data identifying the intended recipient or route point within the contact center as well as an identifier (e.g., calling number, source email address or the like) for the party initiating the transaction. Each of the attributes in the transaction data 120 can be a separate field, but for simplicity of illustration have been demonstrated together as the transaction data 120 in the example of FIG. 3.

The status data 122 can include an indication of the status of the transaction within contact center. For example, the status may identify a transaction as connected or ringing for telephone calls, as open or closed for an IM session, as well as indicate whether a response is due for another type of transaction, such as email or online chat session. Additionally, as demonstrated in FIG. 3, the status data 122 can also specify whether a respective transaction is an inbound transaction or outbound such as corresponding to a callback to an intended recipient. The ACD group data 124 can include an identification of the type of group within the contact center a given transaction is being queued. The ACD group may specify an agent queue, a premium group, a standard group or other types of groups that may be defined for the contact center.

The queue ID 126 specifies the particular queue in which the transaction resides. For example the queue can be a particular agent's agent queue such as agent queue 17, or agent queue 11 or for a particular group ID such as GROUP_1 or GROUP_17 in the example of FIG. 3. The queue ID 126 can be utilized by a queue monitor function of associated agent tools to display a set of queued transactions that a corresponding agent can access. Each transaction can also include priority data 128 that identifies a relative priority of the transaction within the call center. The priority can be determined by the call distribution module (e.g., call distribution module 70 of FIG. 2) based upon routing rules applied to the transaction. The data and parameters noted above are examples of some types of data that may be included in the queue data structure 118. Other types of data and parameters that can be stored for a transaction in a queue data structure 118, such as including temporal information associated with the callback, timing in which calls were placed and the like.

Figure 4:
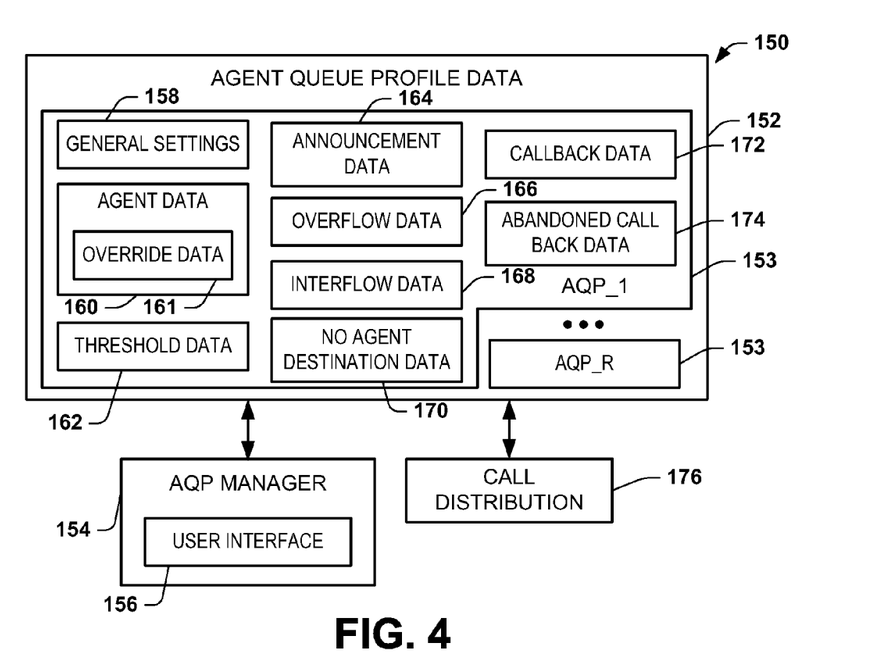
FIG. 4 depicts an example of part of a contact center implementing an agent queue profile.

FIG. 4 depicts an example of an agent queue profile management system 150. The system 150 includes agent queue profile data 152 (e.g., corresponding to the agent queue profile 74 of FIG. 2). The system 150 also includes an agent queue profile (AQP) manager 154 that is programmed to generate and manipulate (e.g., edit and delete) parameters in the agent queue profile data 152. For example, the AQP manager 154 can include a user interface 156 that can be implemented as a GUI having a series of GUI screens associated with each of a plurality of configuration parameters associated with a given agent queue profile. In addition to setting the initial parameters for a new agent queue profile that is stored in the agent queue profile data 152, the APQ manager 154 can also modify or edit an existing agent queue profile such as corresponding to any of the parameters stored therein.

The agent queue profile data 152 can include sets of data that collectively define each agent queue profile 153. There can be any number of one or more agent queue profiles 153, demonstrated in the example of FIG. 4 as AQP_1 through AQP_R, where R is a positive integer denoting the number of agent queue profiles. For additional context, the call distribution method 176 is also demonstrated in FIG. 4, as call distribution methods can utilize the agent queue profile data 152 to control redistribution and re-routing of transactions with respect to an agent queue, such as described herein. Each agent queue profile 153 can include the same types of data demonstrated for AQP_1, although configured according to desired operating requirements for each respective agent queue profile. As one example, different parameters can be set for each agent queue profile 153 according to each agent's role in the contact center, such as to afford supervisors greater flexibility and autonomy than associate agents.

The agent queue profile data 152 can include general settings data 158 that contains a set of parameters to specify how the transactions are handled for a given agent queue that is assigned to the corresponding agent queue profile. For example, the general settings data 158 can include parameters to enable interflow and overflow on calls that are re-queued (e.g., placed back in the agent queue) by the agent. A priority of an incoming transaction can also be specified, which can be a fixed value or a relative value. In addition to setting the priority for incoming calls the general settings data 158 can also include a priority for outgoing calls, which may be a fixed or relative value. Other parameters that can be implemented as part of the general settings data 158 for an agent queue profile can include a target average speed of answer, as well as timers to determine an amount of time each agent has to wrap up and release calls that cannot be answered by the agent. Sources of music can also be specified in the general settings.

The agent queue profile 153 can also include agent data 160. The AQP manager 154 can be utilized to assign any number of one or more agents to a given agent queue profile. This assignment data can be stored in memory as part of the agent data 160 for the respective agent queue profile 153. In one example, each agent may be assigned to a single agent queue profile at a given time such that each agent can have (at most) a single corresponding agent queue. The AQP manager 154 can also be utilized to delete an agent from a given profile, and thereby remove the agent's agent queue from the system. Corresponding override data 161 for setting agent-specific parameters for each agent's agent queue can also be stored as part of the agent data 160.

Threshold data 162 can be specified for the agent queue profile 153. The threshold data 162 can identify criteria for detecting and monitoring changing conditions for transactions within a given agent queue. For example, threshold values can be set to establish different warning levels for selected fields (e.g., time-based fields) of the queue data. The results of applying the thresholds to queue data can provide a graphical representation of the queue data via a GUI, which will vary based on the thresholds. For instance, the representation can employ different color coding or other indicators and alerts that vary depending on a comparison of queue data relative to the thresholds. Examples of thresholds and corresponding displays that can be generated for each agent queue of the agent queue profile 153 can include: a time that a transaction has been queued in the agent queue, a number of transactions that have been abandoned within a given agent queue, an average wait time of an abandoned call, an average wait time for an interflow call, an average of an ACD call in the agent queue, as well as an average transaction time for a given agent. These and other thresholds can be utilized to alert an agent or a supervisor of certain threshold conditions being met as well as be included in reports that may be generated. In some circumstances, the contact center can be programmed to send a message to a predefined user (e.g., a supervisor) in response to the certain threshold(s) being met or exceeded.

Announcement data 164 can also be set via the AQP manager to define one or more announcements that an initiator of a given transaction (e.g., a calling party) can receive while their transaction resides in an agent queue. The type and format of the announcement can vary depending on the type of transaction. For example, the announcements can be a verbal announcement such as in the case of a telephone call or a video conference call transaction. An automatic email announcement can be provided in response to an email transaction. An automatic instant message can also be sent to the initiator for a text-based transaction. One or more announcements can also be played in response to detecting certain events or conditions while the individual remains in the queue.

The announcement data 164 further can be provided as part of a script that is implemented in response to a transaction being placed into the given agent queue. It is to be appreciated that any number of announcements can be provided and some of which may be repeated while a transaction remains in the agent queue. Timing of such announcements and other criteria to initiate a given announcement can also be set and stored as part of the announcement data 164.

The agent queue profile data 152 can also include overflow data 166. The overflow data 166 can be utilized to enable and set overflow parameters for sending a transaction to one or more overflow destinations in response to the occurrence of an overflow condition. One part of the overflow data can be utilized to control the methods by which an agent is selected for overflow. Such methods can include the longest idle agent, a terminal agent, a circular agent search method or a best fit/skill fit method. Alternatively or additionally, the overflow data 166 can also identify one or more overflow destination such as may correspond to an overflow group or to an overflow agent queue. Timing conditions associated with implementing the overflow to the overflow destination can also be set and stored as part of the overflow data 166.

Interflow data 168 can also be stored as part of the agent queue profile 153 for controlling transfer of a transaction from an agent queue to an interflow destination. The interflow data 168 can be utilized to control the timing parameters associated with implementing the interflow, which parameters can define an actual time interval or a predictive interflow that sends the call automatically based on the estimate wait time rather than the actual wait time. The interflow destination can be specified and stored as part of the interflow data 168, such as may include an IRN, a service, a device, a script or another agent queue.

The agent queue profile data 152 can also include no agent destination data 170 that is utilized by call distribution methods 176 for routing calls in a queue if no agents are logged into the agent queue. The destination can be selected from an IRN, a device, a script or an agent queue. The no agent destination data can be linked with the overflow data 166 in that the no agent destination data 170 can be set to utilize the overflow destination as defined by the overflow data 166 as a default prior to seeking to route the transaction to the destination that is defined by the no agent destination data 170.

Callback data 172 can be stored as part of the agent queue profile 153 to allow the initiator of a given transaction to specify parameters for calling the initiator back rather than waiting in the agent queue. One or more call control script can also be defined for the callback data 172 to collect callback parameters from the individual initiating requesting the callback. The callback data 172 can also include a limited time range for callbacks and a transaction type (e.g., a preferred type of communication for the callback), which may be specified by the initiator in response to a user input.

Abandoned callback data 174 can also be set to control automatic callback generation if a transaction is abandoned while in the agent queue. The agent queue profile manager 154 can define a minimum time period for the automatic callback data 174 that a transaction would need to remain in a given agent queue before the system would initiate an automatic callback to the transaction initiator.

Figure 5:
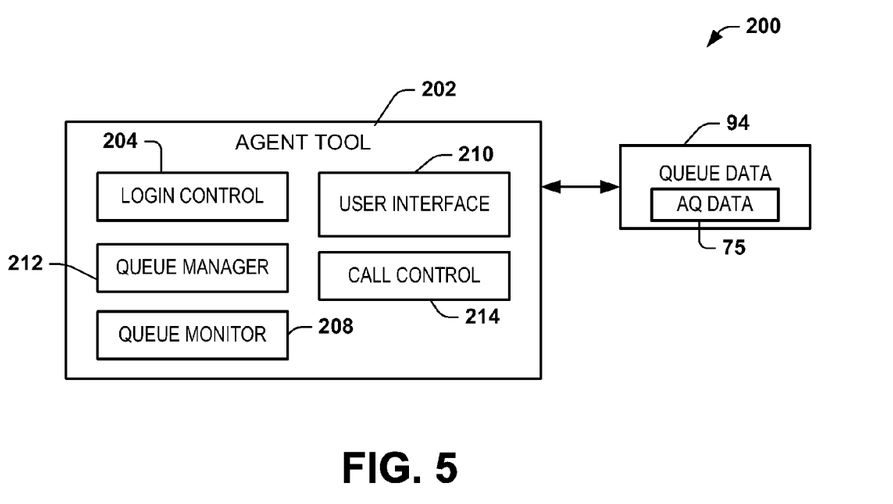
FIG. 5 depicts an example of an agent system that can be implemented in a contact center.

FIG. 5 depicts an example of an agent system 200. The agent system 200 includes an agent tool 202 such as can correspond to functions and methods that each agent user can utilize in a contact center (e.g., the contact center system 50 of FIG. 2). The agent tool 202 can be implemented as instructions stored in memory and executable by processor to perform the associated functions and methods. As an example, the agent tool 202 can be implemented as instructions stored in a device that is connected to the contact center or such instructions can be stored in a server that can be remotely accessed by the agent device. Regardless of its implementation, the agent user can employ a user interface 210 to access the instructions comprising the agent tool 202.

The agent tool 202 can include login control 204 that can be programmed to control logging in and logging out of an agent relative to the contact center system. The login control can for example automatically log an agent user into one or more queues to which the agent has been assigned, such as including an agent queue and one or more groups having respective group queues. Additionally or alternatively, the login control 204 can enable a user to login or log out of each queue separately.

The agent tool can also access queue data 94 that can include transaction data for each transaction that resides in a queue to which the engine has been assigned. As demonstrated in FIG. 5, the queue data 94 can include agent queue data 75 that corresponds to specific transactions that reside in the agent queue for each given agent. For example, an instance of the agent tool 202 can be associated with or linked to the agent queue data 94 in response to the agent logging into the system. A user interface (e.g., a GUI or otherwise) 210 can be utilized to employ the various methods and functions provided by the agent tool 202.

The agent tool 202 may also include a queue monitor 208 that can be utilized to view transactions in a queue that is associated with the agent. A corresponding agent user interface 210 can employ the queue monitor 208 to selectively display transactions for one or more selected queues into which the given agent has been logged. The agent tool 202 can also include a queue manager 212 that allows an agent to manage transactions pending within each queue into which the agent has been logged. For example, an agent user can employ the queue monitor 208 to view the queued transactions and employ the queue manager 212 to transfer one or more selected transactions from one queue to another queue. An agent user, if so authorized, can also employ the queue manager 212 to manipulate and edit a queue. To manipulate or modify a given queue, a given agent user can employ the user interface 210 to implement the desired function of the queue manager 212.

The agent tool 202 can also include a call control method 214 that can be utilized to answer calls, terminate calls and transfer calls to other agents or other destinations within a call center. Thus the call control method 214 can leverage the call distribution modules implemented in the call center for routing calls, such as in response to user inputs enter via the agent user interface 210.

Figure 6:
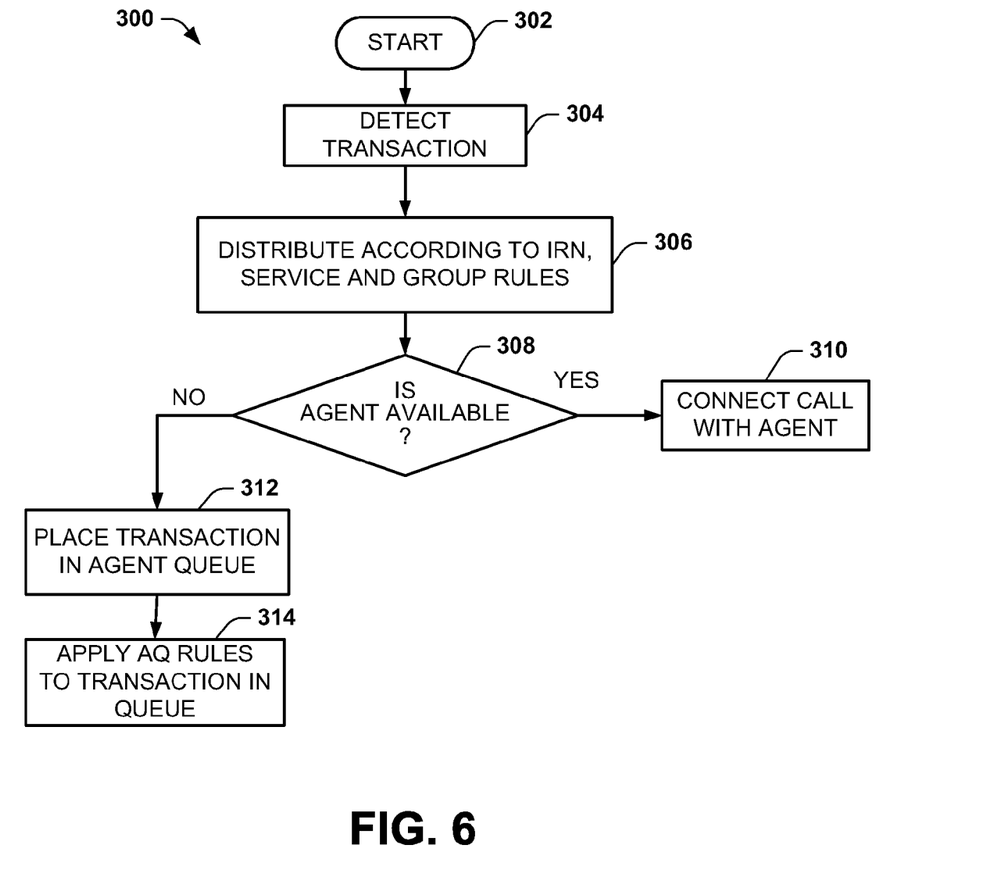
FIG. 6 is a flow diagram depicting an example method for distributing a transaction in a contact center that implements agent queues.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders and/or concurrently from that shown and described herein. The method can be implemented as computer readable instructions, such as can be stored in a non-transitory medium, such as a memory device. The instructions in the medium may be executed by a processing unit.

FIG. 6 illustrates an example of a method 300 that can be implemented for routing a call relative to an agent queue in a call center. The method 300 begins at 302 such as in connection with an agent being logged into at least the agent queue. Such login can also be utilized to log the agent into additional queues, such as an automatic logon to a set of queues and groups to which the agent is associated. At 304, a transaction that is to be routed is detected, such as by a PBX and/or call distribution methods. The transaction can be an inbound transaction or a transaction originating within the contact center. The PBX can employ a look-up table or other routing methods (e.g., the call distribution module 70 of FIG. 2) to identify an appropriate destination for the transaction, such as a routing point.

At 306, the transaction is distributed according to appropriate rules that may include IRN, control script, service or group rules that vary depending upon the call properties associated with the incoming transaction. At 308, a determination is made as to whether an appropriate agent is available for the transaction. If an appropriate agent is available (YES), the method proceeds from 308 to 310 in which the call is connected with the appropriate agent. If an appropriate agent, based on application of rules and agent queue profile parameters, is determined to be not available (NO), the method proceeds to 308 to 312. In this example, it is presumed that the identified agent to which the call is being routed has been assigned to an agent queue profile thereby establishing an agent queue that is personal to the respective agent. Thus, at 312, the transaction is placed into the agent queue for the respective agent that has been identified. Once the transaction has been routed and placed into the agent queue, at 314, distribution methods and routing rules (e.g., corresponding to agent queue functions 98 of FIG. 2) can be applied to the transaction that has been placed in the agent queue. Additionally, an agent user can employ tools (e.g., agent tool 202 of FIG. 5) to access the queue and view, answer or otherwise manipulate the transactions that are in queue.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising:
memory for storing computer readable instructions and data, the data comprising an agent queue profile that includes global parameters to configure an agent queue for each agent that is assigned to the agent queue profile;
a processing unit for accessing the memory and executing the computer readable instructions, the computer readable instructions comprising:
an agent queue profile manager programmed to assign a plurality of agents to the agent queue profile to define a corresponding plurality of agent queues for the plurality of agents, wherein a change to a given global parameter of the global parameters of the agent queue profile is propagated to each of the corresponding plurality of agent queues; and
a distribution module programmed to control distribution of a transaction to a selected agent queue of the plurality of agent queues based on rules and to control handling of the transaction in the selected agent queue based on the agent queue profile; wherein the agent queue profile further comprises login data that is configured via the agent queue profile manager, to enable automatic login to the selected agent queue in response to logging into a distribution group to which a given agent of the plurality of agents belongs and that is separate from the selected agent queue, wherein another plurality of agents belongs to the distribution group and only the given agent belongs to the selected agent queue.

2. The system of claim 1, wherein the distribution module is programmed to employ service routing or intelligent routing number (IRN) to route the transaction to the selected agent queue.

3. The system of claim 1, wherein the agent queue profile comprises an override parameter comprising a programmable caller identifier for a given agent of the plurality of agents that is utilized to identify outgoing calls placed via the selected agent queue as originating from a predetermined location.

4. The system of claim 1, wherein the agent queue profile comprises an override parameter comprising a direct inward dialing (DID) data, corresponding to an identifier assigned to a given agent of the plurality of agents, to control routing of a DID transaction for the given agent to the selected agent queue based on the DID data.

5. The system of claim 4, wherein information relating to each DID call that is routed to the selected agent queue is stored as log data in the memory.

6. The system of claim 1, wherein the agent queue profile further comprises logout data that is configured, via the agent queue profile manager, to control transfer of each pending transaction from the selected agent queue to another queue destination based on the logout data in response to the given agent logging out.

7. The system of claim 1, wherein the selected agent queue operates as at least two of an intelligent routing number, a service and an automatic distribution group for routing the transaction to a given agent of the plurality of agents.

8. The system of claim 1, wherein the distribution module is programmed to transfer a pending transaction from another queue to the selected agent queue based on at least one of rules stored in the memory or in response to a user input of a given agent of the plurality of agents.

9. The system of claim 1, wherein the global parameters of the agent queue profile further comprise overflow data that is programmed to establish at least one overflow destination for sending a pending transaction from a given one of the corresponding plurality of agent queues if an overflow condition exists, the overflow destination comprising at least one of an agent group and another agent queue.

10. The system of claim 1, wherein the global parameters of the agent queue profile further comprise interflow data that is configured to establish at least one interflow destination for transferring a pending transaction from a given one of the corresponding plurality of agent queues in response to determining that an interflow condition exists, the interflow destination comprising at least one of an intelligent routing number, a service, a device, a script and another agent queue, wherein the interflow condition includes an estimated wait time for the pending transaction.

11. The system of claim 1, wherein the computer readable instructions further comprise an abandoned call handler programmed to generate a callback for a transaction abandoned by a calling party while in the selected agent queue, the callback being placed as an outgoing call into the selected agent queue based on the agent queue profile.

12. The system of claim 1, wherein the agent queue profile includes an override parameter associated with a proper subset of the plurality of agents, wherein a change to the override parameter of the agent queue profile is propagated only to the agent queue for each agent of the proper subset of the plurality of agents.

13. A non-transitory computer-readable medium having computer-executable instructions comprising:
an agent queue manager programmed to set global parameters of an agent queue profile and to assign a plurality of agents to the agent queue profile to define a corresponding plurality of agent queues, wherein each of the corresponding plurality of agent queues is personal for each given agent of the plurality of agents, wherein a change to a given global parameter of the global parameters of the agent queue profile is propagated to each of the corresponding plurality of agent queues;
a distribution module programmed to control routing of a transaction within a contact center, including routing of the transaction to a selected agent queue of the plurality of corresponding plurality of agent queues, based on rules; and
an agent queue function programmed to control handling of each transaction that is pending in the selected agent queue based on the global parameters of the agent queue profile, wherein the agent queue profile further comprises login data that is configured, via the agent queue profile manager, to enable automatic login to the selected agent queue in response to logging into a distribution group to which a given agent of the plurality of agents belongs and that is separate from the selected agent queue, wherein another plurality of agents belongs to the distribution group and only the given agent belongs to the selected agent queue.

14. The non-transitory computer readable medium of claim 13, wherein the computer-executable instructions further comprise a direct inward dialing (DID) redirect function programmed to redirect routing of a DID call, corresponding to an intelligent routing number for a given agent of the plurality of agents, to the selected agent queue based on DID data that is included in an override parameter of the agent queue profile for the given agent, transaction information relating to each DID call that is routed to the selected agent queue being stored as call log data in memory.

15. The non-transitory computer readable medium of claim 13, wherein the agent queue function further comprises:
an agent queue overflow method programmed, in response to determining that an overflow condition exists, to enable at least one additional agent associated with at least one overflow destination to handle a transaction pending in the selected agent queue, the overflow destination comprising at least one of an agent group and another agent queue.

16. The non-transitory computer readable medium of claim 13, wherein the agent queue function further comprises:
an agent queue interflow method programmed, in response to determining that an interflow condition exists, to transfer a pending transaction from the selected agent queue to an interflow destination, the interflow destination comprising at least one of an intelligent routing number, a service, a device, a script and another agent queue, wherein the interflow condition includes an estimated wait time for the pending transaction.

17. A contact center system comprising:
a distribution module to control routing of each transaction that enters the contact center system based on rules stored in memory;
an agent queue profile that includes global parameters to control handling of each transaction that is placed in a corresponding agent queue, the parameters of the agent queue profile being stored in the memory;
an agent queue manager programmed to assign a plurality of agents to the agent queue profile to generate a corresponding plurality of agent queues, wherein each of the corresponding plurality of agents queues is personal to a given agent of the plurality of agents; and
an agent queue function programmed to control handling of each transaction that is placed in any of the corresponding plurality of agent queues based on the global parameters of the agent queue profile, wherein a change to a given global parameter of the global parameters of the agent queue profile is propagated to each of the corresponding plurality of agent queues, wherein the agent queue profile further comprises login data that is configured, via the agent queue profile manager, to enable automatic login to a selected agent queue in response to logging into a distribution group to which the given agent of the plurality of agents belongs and that is separate from the selected agent queue, wherein another plurality of agents belongs to the distribution group and only the given agent belongs to the selected agent queue.

18. The system of claim 17, further comprising an agent device configured to access transactions routed to a selected agent of the plurality of agents or to a given agent queue of the plurality of agent queues generated for the selected agent.

19. The system of claim 17, further comprising a direct inward dialing (DID) redirect function programmed to redirect routing of a DID call, corresponding to an intelligent routing number for a selected agent of the plurality of agents, to a given agent queue of the plurality of agent queues based on DID data that is part of the agent queue profile for the selected agent, information relating to each DID call that is routed to the given agent queue being stored as log data in the memory.

20. A method for implementing an agent queue in a contact center, the method comprising:
distributing a transaction to a selected agent queue of a plurality of agent queues within a contact center; and
controlling handling of each transaction that is pending in a given agent queue based on global parameters of an agent queue profile, each of the plurality of agent queues corresponding to an instance of the agent queue profile that is assigned to the given agent of a plurality of agents within the contact center, wherein a change to a given global parameter of a set of global parameters of the agent queue profile is propagated to each of the plurality of agent queues; and enabling automatic login to the selected agent queue in response to the given agent logging into a distribution group to which the given agent of the plurality of agents belongs and that is separate from the selected agent queue, wherein another plurality of agents belongs to the distribution group and only the given agent belongs to the selected agent queue.

21. The method of claim 20, further comprising redirecting routing of a DID call, corresponding to an intelligent routing number for the given agent of the plurality of agents, to the selected agent queue based on DID data that is part of the agent queue profile for the given agent, information relating to each DID call that is routed to the selected agent queue being stored as log data in memory.

* * * * *